United States Patent
Cavalieri et al.

(10) Patent No.: US 10,087,318 B2
(45) Date of Patent: *Oct. 2, 2018

(54) ETHYLENE POLYMER COMPOSITION AND USE THEREOF IN POLYOLEFIN COMPOSITIONS

(71) Applicant: BASELL POLYOLEFINE GMBH, Wesseling (DE)

(72) Inventors: Claudio Cavalieri, Ferrara (IT); Michele Grazzi, Ferrara (IT); Roberto Pantaleoni, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/313,503

(22) PCT Filed: Apr. 28, 2015

(86) PCT No.: PCT/EP2015/059240
§ 371 (c)(1),
(2) Date: Nov. 22, 2016

(87) PCT Pub. No.: WO2015/180917
PCT Pub. Date: Dec. 3, 2015

(65) Prior Publication Data
US 2017/0190890 A1    Jul. 6, 2017

(30) Foreign Application Priority Data
May 28, 2014 (EP) ................................. 14170313

(51) Int. Cl.
*C08L 23/12* (2006.01)
*C08L 23/06* (2006.01)
*C08L 23/08* (2006.01)

(52) U.S. Cl.
CPC ............... *C08L 23/12* (2013.01); *C08L 23/06* (2013.01); *C08L 23/0815* (2013.01); *C08L 2205/025* (2013.01); *C08L 2205/03* (2013.01); *C08L 2207/02* (2013.01); *C08L 2308/00* (2013.01)

(58) Field of Classification Search
CPC ...... C08L 23/0815; C08L 23/06; C08L 23/12; C08L 23/16; C08L 2205/025; C08L 2205/03; C08L 2207/02; C08L 2308/00
See application file for complete search history.

(56) References Cited

U.S. PATENT DOCUMENTS

| | | | |
|---|---|---|---|
| 9,873,783 B2* | 1/2018 | Cavalieri et al. | C08L 23/06 |
| 2003/0092845 A1* | 5/2003 | Takahashi et al. | C08L 23/0815 525/240 |
| 2005/0165171 A1 | 7/2005 | Pelliconi et al. | |
| 2008/0090969 A1 | 4/2008 | Pelliconi et al. | |
| 2017/0183485 A1* | 6/2017 | Cavalieri et al. | C08L 23/06 |

FOREIGN PATENT DOCUMENTS

| | | |
|---|---|---|
| EP | 2592112 A1 | 5/2013 |
| JP | H10204231 A | 8/1998 |
| JP | 2005-520011 A | 7/2005 |
| WO | WO-06067023 A1 | 6/2006 |
| WO | WO-2013026864 A1 | 2/2013 |

OTHER PUBLICATIONS

PCT International Search Report and Written Opinon dated Aug. 4, 2015 (Aug. 4, 2015) for Corresponding PCT/EP2015/059240.

* cited by examiner

*Primary Examiner* — Nathan M Nutter

(57) ABSTRACT

Ethylene polymer composition comprising, all percent amounts being by weight:
A) 30-60% of an ethylene polymer containing 10% or less, referred to the weight of A), of a fraction $XS_A$ soluble in xylene at 25° C.;
B) 40-70% of a copolymer of ethylene with at least one olefin of formula $HC_2=CHR$, where R is a alkyl radical, linear or branched, having from 2 to 8 carbon atoms, containing 65-90% of ethylene and 55-15% of a fraction $XS_B$ soluble in xylene at 25° C., both the ethylene of the copolymer and $XS_B$ amounts being referred to the weight of B), the intrinsic viscosity [η] of the $XS_B$ fraction ranging from 0.8 to 3.2 dl/g;
wherein the amounts of A) and B) are referred to the total weight of A)+B).

13 Claims, No Drawings

ETHYLENE POLYMER COMPOSITION AND USE THEREOF IN POLYOLEFIN COMPOSITIONS

This application is the U.S. National Phase of PCT International Application PCT/EP2015/059240, filed Apr. 28, 2015, claiming benefit of priority to European Patent Application No. 14170313.2, filed May 28, 2014, the contents of which are incorporated herein by reference in its entirety.

FIELD OF THE INVENTION

The present disclosure relates to an ethylene polymer composition and to its use as an additive, in particular as an impact modifier, for polyolefin compositions.

BACKGROUND OF THE INVENTION

Impact modifiers, consisting of or comprising a prevailingly amorphous olefin copolymer, may be added in polyolefin compositions to enhance the impact resistance and optionally optical properties.

Applicants presently believe that by selecting specific ethylene copolymers, it is possible to obtain an ethylene polymer composition particularly suited for preparing final polyolefin compositions having a particular set of properties.

In particular, the ethylene polymer composition of the present disclosure provides polyolefin compositions having a balance of elongation at break, optical properties (high gloss) and reduced shrinkage on cooling, while maintaining a good impact resistance

SUMMARY OF THE INVENTION

The present disclosure provides ethylene polymer compositions comprising (all percent amounts being by weight):
A) 30-60%, alternatively 30-55%, of an ethylene polymer containing 10% or less, alternatively 8% or less, alternatively 6% or less, referred to the weight of A), of a fraction $XS_A$ soluble in xylene at 25° C.;
B) 40-70%, alternatively 45-70%, of a copolymer of ethylene with at least one olefin of formula $HC_2=CHR$, where R is a alkyl radical, linear or branched, having from 2 to 8 carbon atoms, containing 65-90%, alternatively 70-90% of ethylene and 55-15%, alternatively 50-20%, of a fraction $XS_B$ soluble in xylene at 25° C., both the ethylene of the copolymer and $XS_B$ amounts being referred to the weight of B), the intrinsic viscosity [η] of the $XS_B$ fraction ranging from 0.8 to 3.2 dl/g, alternatively from 1.0 to 3.0 dl/g, alternatively from 1.0 to 2.0 dl/g;
wherein the amounts of A) and B) are referred to the total weight of A)+B).

DETAILED DESCRIPTION OF THE INVENTION

In general, the term "copolymer" is meant to include also polymers containing more than one kind of comonomers, such as terpolymers.

The ethylene polymer A may be an ethylene homopolymer (i) or a copolymer (ii) of ethylene with one or more comonomers selected from olefins having formula $CH_2=CHR^1$ wherein $R^1$ is an alkyl radical, linear or branched, having from 1 to 10 carbon atoms, or a mixture of (i) and (ii).

Specific examples of said olefins are propylene, butene-1, pentene-1, 4-methylpentene-1, hexene-1, octene-1 and decene-1.

The ethylene polymer A) may have a density of from 0.930 to 0.960 g/cm³, alternatively from 0.935 to 0.955 g/cm³, as determined according to ISO 1183 at 23° C.

The component B) in the ethylene polymer composition of the present disclosure may be an ethylene copolymer which is optionally more soluble in xylene, thus less crystalline, than component A).

Specific examples of $HC_2=CHR$ olefins are butene-1, pentene-1, 4-methylpentene-1, hexene-1, octene-1 and decene-1.

The ethylene polymer composition of the present invention preferably may have a melting peak at a temperature Tm of 120° C. or higher, alternatively from 120° C. to 130° C., as measured by Differential Scanning Calorimetry with a heating rate of 20° C. per minute.

The melt flow rate (MFR) of the ethylene polymer composition may be from 0.3 to 15 g/10 min., alternatively from 0.5 to 10 g/10 min., as determined according to ISO 1133 at 230° C. with a load of 2.16 kg.

Moreover, the ethylene polymer composition of the present invention can have at least one of the following additional features:
- a MFR value of the ethylene polymer A), determined according to ISO 1133 at 230° C. with a load of 2.16 kg, of from 1 to 20 g/10 min.;
- glass transition temperature (Tg), measured on the blend of A)+B), from −45 to −60° C.;
- Tg of component B) from −45 to −60° C.;
- an ethylene content, determined on the total amount of A)+B), of 75-93% by weight, alternatively 80-93% by weight;
- an amount of total fraction $XS_{TOT}$ soluble in xylene at 25° C., determined by extraction carried out on the total amount of A)+B), of 10-35% by weight, alternatively 10-30% by weight;
- an intrinsic viscosity [η] of the $XS_{TOT}$ fraction of 0.8 dl/g or more, alternatively from 0.9 to 2.9 dl/g, alternatively from 0.9 to 1.9;
- a flexural modulus value from 150 to 350 MPa.

All the said [η] values are measured in tetrahydronaphthalene at 135° C.

Applicants presently believe that in the composition of the present disclosure, the Tg of B) may substantially determine the Tg of the blend of A)+B), so that, when the Tg value measured on the blend of A)+B) is of −57° C. or higher, the Tg of B) has still to be equal to or higher than −60° C.

While there is no limitation in principle on the kind of polymerization process and catalysts to be used, it has been found that the ethylene polymer composition of the present disclosure can be prepared by sequential polymerization. The sequential polymerization may comprise at least two sequential steps. In such a two sequential step process, components A) and B) may be prepared in separate subsequent steps, operating in each step, except the first step, in the presence of the polymer formed and the catalyst used in the preceding step. The catalyst may be added only in the first step, however its activity is such that it may still be active for all subsequent steps.

The polymerization, which can be continuous or batch, may be carried out operating in liquid phase, in the presence or not of inert diluent, or in gas phase, or by mixed liquid-gas techniques.

Reaction time, pressure and temperature relative to the polymerization steps may not be critical, however in various embodiments the temperature is in a range of from 50 to 100° C. The pressure may be atmospheric or higher.

The regulation of the molecular weight may be carried out by using regulators such as hydrogen.

The polymerizations of the present disclosure may be carried out in the presence of a Ziegler-Natta catalyst. Typically a Ziegler-Natta catalyst comprises the product of the reaction of an organometallic compound of group 1, 2 or 13 of the Periodic Table of elements with a transition metal compound of groups 4 to 10 of the Periodic Table of Elements (new notation). In particular, the transition metal compound may be selected among compounds of Ti, V, Zr, Cr and Hf and is preferably supported on $MgCl_2$.

In an embodiment, the catalysts may comprise the product of the reaction of the organometallic compound of group 1, 2 or 13 of the Periodic Table of elements, with a solid catalyst component comprising a Ti compound and an electron donor compound supported on $MgCl_2$.

In an embodiment, the organometallic compounds may be aluminum alkyl compounds.

In a particular embodiment, the ethylene polymer composition of the present invention may be obtainable by using a Ziegler-Natta polymerization catalyst, alternatively a Ziegler-Natta catalyst supported on $MgCl_2$, alternatively a Ziegler-Natta catalyst comprising the product of reaction of:
1) a solid catalyst component comprising a Ti compound and an electron donor (internal electron-donor) supported on $MgCl_2$;
2) an aluminum alkyl compound (cocatalyst); and, optionally,
3) an electron-donor compound (external electron-donor).

The solid catalyst component (1) may contain as an electron-donor a compound generally selected among the ethers, ketones, lactones, compounds containing N, P and/or S atoms, and mono- and dicarboxylic acid esters.

Embodiments of catalysts having the above mentioned characteristics are described in U.S. Pat. No. 4,399,054 and European Patent No. 45977.

Particularly suited among the said electron-donor compounds may be phthalic acid esters, alternatively diisobutyl phthalate, and succinic acid esters.

Suitable succinic acid esters are represented by the formula (I):

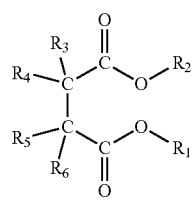

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ may be $C_1$-$C_8$ alkyl, cycloalkyl, aryl, arylalkyl and alkylaryl groups. In various embodiments, $R_1$ and $R_2$ may be selected from primary alkyls and in particular branched primary alkyls. Examples of suitable $R_1$ and $R_2$ groups may include methyl, ethyl, n-propyl, n-butyl, isobutyl, neopentyl, 2-ethylhexyl.

In various embodiments, the compounds described by the formula (I) may be that in which $R_3$ to $R_5$ are hydrogen and $R_6$ is a branched alkyl, cycloalkyl, aryl, arylalkyl and alkylaryl radical having from 3 to 10 carbon atoms. Alternatively, the group of compounds within those of formula (I) may be those in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In various embodiments, the two radicals different from hydrogen are linked to the same carbon atom. In still further embodiments, the compounds in which at least two radicals different from hydrogen are linked to different carbon atoms, that is $R_3$ and $R_5$ or $R_4$ and $R_6$ may be used.

Other electron-donors particularly suited may be the 1,3-diethers, as illustrated in published European patent applications EP-A-361 493 and 728769.

As cocatalysts (2), one may use the trialkyl aluminum compounds, such as Al-triethyl, Al-triisobutyl and Al-tri-n-butyl.

The electron-donor compounds (3) that may be used as external electron-donors (added to the Al-alkyl compound) include the aromatic acid esters (such as alkylic benzoates), heterocyclic compounds (such as the 2,2,6,6-tetramethylpiperidine and the 2,6-diisopropylpiperidine), and silicon compounds containing at least one Si—OR bond (where R is a hydrocarbon radical).

Examples of the said silicon compounds are those of formula $R^2_a R^3_b Si(OR^4)_c$, where a and b are integer numbers from 0 to 2, c is an integer from 1 to 3 and the sum (a+b+c) is 4; $R^2$, $R^3$ and $R^4$ are alkyl, cycloalkyl or aryl radicals with 1-18 carbon atoms optionally containing heteroatoms.

Useful examples of silicon compounds include (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

The previously said 1,3-diethers are also suitable to be used as external donors. In various embodiments, the case that the internal donor is one of the said 1,3-diethers, the external donor can be omitted.

The catalysts may be precontacted with small quantities of olefin (prepolymerization), maintaining the catalyst in suspension in a hydrocarbon solvent, and polymerizing at temperatures from room to 60° C., thus producing a quantity of polymer from 0.5 to 3 times the weight of the catalyst.

The catalyst may alternatively be precontacted with liquid monomer, producing a quantity of polymer up to 1000 times the weight of the catalyst.

The ethylene polymer composition of the present disclosure can also contain additives, such without limitation antioxidants, light stabilizers, heat stabilizers, colorants and fillers.

As previously said, the ethylene polymer composition of the present disclosure may be advantageously compounded with additional polyolefins, in particular propylene polymers such as propylene homopolymers, random copolymers, and thermoplastic elastomeric polyolefin compositions. Accordingly, in an alternative embodiment of the present disclosure, a polyolefin composition containing the above-defined ethylene polymer composition. In various embodiments, the polyolefin composition may comprise at least 50% by weight, alternatively from 50% to 85% by weight, of one or more additional polyolefins, thus 50% or less, alternatively from 15% to 50% by weight, of the ethylene polymer composition according to the present disclosure, all percent amounts being referred to the total weight of the ethylene polymer composition and of the additional polyolefin or polyolefins.

Alternative examples of the said additional polyolefins may include the following polymers:
1) crystalline propylene homopolymers, such as isotactic or mainly isotactic homopolymers;
2) crystalline propylene copolymers with ethylene and/or a $C_4$-$C_{10}$ α-olefin, wherein the total comonomer content ranges from 0.05 to 20% by weight with respect to the weight of the copolymer, and wherein the $C_4$-$C_{10}$ α-olefins may include without limitation 1-butene; 1-hexene; 4-methyl-1-pentene and 1-octene;
3) crystalline ethylene homopolymers and copolymers with propylene and/or a $C_4$-$C_{10}$ α-olefin, such as high density polyethylene ("HDPE");
4) thermoplastic elastomeric compositions comprising one or more of propylene homopolymers and/or the copolymers of item 2) and an elastomeric moiety comprising one or more copolymers of ethylene with propylene and/or $C_4$-$C_{10}$ α-olefins, optionally containing minor quantities of a diene, such as butadiene, 1,4-hexadiene, 1,5-hexadiene and ethylidene-1-norbornene, wherein the diene content may be from 1 to 10% by weight, optionally prepared by mixing the components in the molten state or by sequential polymerization, and optionally containing the said elastomeric moiety in quantities from 5 to 80% by weight.

The polyolefin composition may be manufactured by mixing the ethylene polymer composition and the additional polyolefin(s) together, extruding the mixture, and pelletizing the resulting composition using known techniques and apparatus.

The polyolefin composition may also contain conventional additives, including without limitation, mineral fillers, colorants and stabilizers. Mineral fillers that can be included in the composition include talc, $CaCO_3$, silica, such as wollastonite ($CaSiO_3$), clays, diatomaceaous earth, titanium oxide and zeolites. The mineral filler may be in particle form having an average diameter ranging from 0.1 to 5 micrometers.

The present disclosure also provides final articles, in particular injection molded articles, such as finished parts for the automotive industry, made of or comprising the said polyolefin composition.

Analytical Methods

The following analytical methods may be used to characterize the polymer compositions.

Melting temperature (ISO 11357-3)

Determined by differential scanning calorimetry (DSC). A sample weighting 6±1 mg was heated to 200±1° C. at a rate of 20° C. min and kept at 200±1° C. for 2 minutes in nitrogen stream and was thereafter cooled at a rate of 20° C. min to 40±2° C., thereby kept at this temperature for 2 min to crystallize the sample. Then, the sample was again melted at a temperature rise rate of 20° C. min up to 200° C.±1. The melting scan was recorded, a thermogram was obtained, and, from this, temperatures corresponding to peaks were read. The temperature corresponding to the most intense melting peak recorded during the second fusion was taken as the melting temperature. If only one peak was detected, the melting temperature was provided by (i.e. measured on) such peak.

Xylene Soluble Fraction 2.5 g of polymer and 250 cm³ of o-xylene were introduced in a glass flask equipped with a refrigerator and a magnetic stirrer. The temperature was raised over 30 minutes from room temperature up to the boiling point of the solvent (135° C.). The so obtained clear solution was then kept under reflux and stirring for a further 30 minutes. The closed flask was then kept in a thermostatic water bath at 25° C. for 30 minutes as well so that the crystallization of the insoluble (XI) part of the sample takes place. The so formed solid was filtered on quick filtering paper. 100 cm³ of the filtered liquid was poured in a previously weighed aluminum container which was heated on a heating plate under nitrogen flow, to remove the solvent by evaporation. The container was then kept in an oven at 80° C. under vacuum to dryness and then weighed after constant weight was obtained.

Thus one calculated the percent by weight of polymer soluble and insoluble in xylene at 25° C.

Melt Flow Rate

The melt flow rate was measured according to ISO 1133 at 230° C. with a load of 2.16 kg, unless otherwise specified.

[η] intrinsic viscosity

The sample was dissolved in tetrahydronaphthalene at 135° C. and then was poured into the capillary viscometer. The viscometer tube (Ubbelohde type) was surrounded by a cylindrical glass jacket; this setup allows temperature control with a circulating thermostated liquid. The downward passage of the meniscus was timed by a photoelectric device.

The passage of the meniscus in front of the upper lamp starts the counter which had a quartz crystal oscillator. The meniscus stops the counter as it passes the lower lamp and the efflux time was registered: this was converted into a value of intrinsic viscosity through Huggins' equation (Huggins, M. L., *J. Am. Chem. Soc.*, 1942, 64, 2716) provided that the flow time of the pure solvent was known at the same experimental conditions (same viscometer and same temperature). One single polymer solution was used to determine [η].

Ethylene, Propylene or Butene-1 content determined via I.R. Spectroscopy

The NIR (6000-5500 cm$^{-1}$) spectrum of as pressed film of the polymer was recorded in absorbance vs. wavenumbers (cm$^{-1}$). The following measurements were used to calculate the ethylene content:
a) Height of the absorption band due to $CH_2$ group, with maximum at 5669 cm$^{-1}$, omitting area beneath a baseline drawn between the 6000-5500 cm$^{-1}$.
b) Height of the shoulder at 5891 cm$^{-1}$ due to $CH_3$ group, omitting area beneath a baseline drawn between the 6000-5500 cm$^{-1}$.

The ratio D5891/D5669 was calibrated by analyzing copolymers of known compositions, determined by NMR spectroscopy.

The following measurements were used to calculate the propylene content:
a) Area (ANIR) of the combination absorption bands between 4482 and 3950 cm$^{-1}$ which was used for spectrometric normalization of film thickness.
b) Area (A971) of the absorption band due to propylene sequences in the range 986-952 cm$^{-1}$, omitting area beneath a baseline drawn between the endpoints.

The ratio A971/ANIR was calibrated by analyzing copolymers of known compositions, determined by NMR spectroscopy.

The following measurements were used to calculate the 1-butene content:

Area (Ac4) of the absorption band due to ethyl branches from 1-butene units in the range 781-750 cm$^{-1}$, omitting area beneath a baseline drawn between the endpoints.

The ratio Ac4/ANIR was calibrated by analysing copolymers of known compositions, determined by NMR spectroscopy.

Tg determination via DMTA (Dynamic Mechanical Thermal Analysis)

Molded specimen of 20 mm×5 mm×1 mm were fixed to the DMTA machine for tensile stress. The frequency of the sinusoidal oscillation was fixed at 1 Hz. The DMTA translate the elastic response of the specimen starting from –100° C. (glassy state) to 130° C. (softening point). In this way it was possible to plot the elastic response versus temperature. The elastic modulus in DMTA for a viscoelastic material was defined as the ratio between stress and strain also defined as complex modulus E*=E'+iE". The DMTA can split the two components E' and E" by their resonance and it is possible to plot E' (elastic component), E" (loss modulus) and E"/E'=tan δ (damping factor) vs temperature. The glass transition temperature Tg was assumed to be the temperature at the maximum of the curve tan=(δ) E"/E' vs temperature.

Flexural Modulus*: ISO 178, was measured 24 hours after molding.

Tensile strength at yield*: ISO 527, was measured 24 hours after molding.

Tensile strength at break*: ISO 527, was measured 24 hours after molding.

Elongation at break and at yield*: ISO 527, was measured 24 hours after molding.

Notched IZOD impact test*: ISO 180/1A

The IZOD values were measured at 23° C., –20° C. and –30° C., 24 hours after molding.

Note: *Test specimens were prepared by injection molding according to ISO 1873-2: 1989.

Gloss at 60°

A ISO D1 plaque of 1 mm was molded in an injection molding machine "NB 60" (where 60 stands for 60 tons of clamping force) in accordance with the following parameters.

Melt temperature=260° C.,
Mold temperature=40° C.,
Injection speed=100 mm/sec,
Holding time=10 sec,
Screw rotation=120 rpm Injection and Holding pressures were properly set-up in order to assure a complete filling of the mold thus avoiding flashes.

Alternatively an injection molding machine "NB VE70" (where 70 stands for 70 tons of clamping force) could have been used.

Gloss@60° was measured on the plaque according to ASTM D 2457.

Longitudinal and Transversal Thermal Shrinkage

A plaque of 100×200×2.5 mm was molded in an injection molding machine "SANDRETTO series 7 190" (where 190 stands for 190 tons of clamping force).

The injection conditions were:
melt temperature=250° C.;
mold temperature=40° C.;
injection time=8 seconds;
holding time=22 seconds;
screw diameter=55 mm.

The plaque was measured 24 hours after molding, through calipers, and the shrinkage was given by:

$$\text{Longitudinal shrinkage} = \frac{200 - \text{read\_value}}{200} \times 100$$

$$\text{Transversal shrinkage} = \frac{100 - \text{read\_value}}{100} \times 100$$

wherein 200 was the length (in mm) of the plaque along the flow direction, measured immediately after molding;

100 was the length (in mm) of the plaque crosswise the flow direction, measured immediately after molding;

the read_value was the plaque length in the relevant direction.

EXAMPLES

The practice and advantages of the various embodiments, compositions and methods as provided herein are disclosed below in the following examples. These Examples are illustrative, and are not intended to limit the scope of the present disclosure, or appended claims, in any manner whatsoever.

Example 1

Preparation of the Ethylene Polymer Composition

The solid catalyst component used in polymerization was a Ziegler-Natta catalyst component supported on magnesium chloride, containing titanium and diisobutylphthalate as internal donor, prepared as follows.

An initial amount of microspheroidal MgCl$_2$.2.8C$_2$H$_5$OH was prepared according to the method described in Example 2 of U.S. Pat. No. 4,399,054 but operating at 3,000 rpm instead of 10,000. The method described in Example 2 of U.S. Pat. No. 4,399,054 is hereby incorporated by reference in full. The so obtained adduct was then subject to thermal dealcoholation at increasing temperatures from 30 to 130° C. operating in nitrogen current until the molar alcohol content per mol of Mg was 1.16.

Into a 1000 mL four-necked round flask, purged with nitrogen, 500 mL of TiCl$_4$ was introduced at 0° C. While stirring, 30 grams of the microspheroidal MgCl$_2$.1.16C$_2$H$_5$OH adduct (prepared as described above) were added. The temperature was raised to 120° C. and kept at this value for 60 minutes. During the temperature increase, an amount of diisobutylphthalate was added such as to have a Mg/diisobutylphthalate molar ratio of 18. After the mentioned 60 minutes, the stirring was stopped, the liquid was siphoned off and the treatment with TiCl$_4$ was repeated at 100° C. for 1 hour in the presence of an amount of diisobutylphthalate such as to have a Mg/diisobutylphthalate molar ratio of 27. After that time the stirring was stopped, the liquid was siphoned off and the treatment with TiCl$_4$ was repeated at 100° C. for 30 min. After sedimentation and siphoning at 85° C. the solid was washed six times with anhydrous hexane (6×100 ml) at 60° C.

Catalyst System And Prepolymerization Treatment

Before introducing it into the polymerization reactors, a pre-contact step was carried out by contacting, at 30° C. for 9 minutes, the solid catalyst component described above with aluminum triethyl (TEAL) and dicyclopentyldimethoxysilane (DCPMS), in a TEAL/DCPMS weight ratio equal to about 15 and in such quantity that the TEAL/solid catalyst component weight ratio be equal to 5.

The catalyst system was then subjected to prepolymerization by maintaining it in suspension in liquid propylene at 50° C. for about 75 minutes before introducing it into the first polymerization reactor.

Polymerization

The polymerization was carried out in continuous in a series of two gas-phase reactors equipped with devices to transfer the product from the first reactor to the second one.

Into the first gas phase polymerization reactor an ethylene/propylene copolymer (component A)) was produced by feeding in a continuous and constant flow the prepolymerized catalyst system, hydrogen (used as molecular weight regulator), ethylene and propylene in the gas state.

The ethylene polymer coming from the first reactor was discharged in a continuous flow and, after having been purged of unreacted monomers, was introduced, in a continuous flow, into the second gas phase reactor, together with quantitatively constant flows of hydrogen and butene-1 in the gas state.

In the second reactor an ethylene/butene-1 copolymer (component B)) was produced. Polymerization conditions, molar ratio of the reactants and composition of the copolymers obtained are shown in Table I.

The polymer particles exiting the second reactor, which constitute the not stabilized ethylene polymer composition according to the present disclosure, were subjected to a steam treatment to remove the reactive monomers and volatile substances, and then dried.

Then the polymer particles were mixed with a usual stabilizing additive composition in a twin screw extruder Berstorff ZE 25 (length/diameter ratio of screws: 33) and extruded under nitrogen atmosphere under the following conditions:

Rotation speed: 250 rpm;
Extruder output: 15 kg/hour;
Melt temperature: 280-290° C.

The stabilizing additive composition was made of the following components:

0.1% by weight of Irganox® 1010;
0.1% by weight of Irgafos® 168;
0.04% by weight of DHT-4A (hydrotalcite).

Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, while Irgafos® 168 is tris(2,4-di-tert.-butylphenyl)phosphite.

The percent amounts were referred to the total weight of the polymer and stabilizing additive composition.

The characteristics relating to the polymer composition, reported in Table II, were obtained from measurements carried out on the so extruded polymer, which constitutes the stabilized ethylene polymer composition according to the exemplary embodiments disclosed herein.

Preparation of a Blend of the Stabilized Ethylene Polymer Composition with Propylene Polymer The stabilized ethylene polymer composition prepared as described above (hereinafter called SEP) was blended by extrusion under the previously described conditions with a heterophasic polypropylene composition (HPP) and the other additives hereinafter described, in the proportions reported below and in Table III. The properties of the so obtained final composition are reported in Table III.

Added Components

1 HPP: heterophasic polypropylene composition having MFR of 16.5 g/10 min., made of 70% by weight of propylene homopolymer with isotactic index of 98% (fraction insoluble in xylene at 25° C., determined as described above) and 30% by weight of an ethylene/propylene copolymer containing 49% by weight of ethylene;

2 talc HTP Ultra 5C: fine talc powder comprising about 98% by weight of particles having particle size of less than 5 μm;

3 carbon black master-batch having total MFR of about 0.6 g/10 min. (measured according to ISO 1133 at 230° C./5 kg load) and made of 40% by weight of carbon black and 60% of a copolymer of propylene with 8% by weight of ethylene, having MFR of about 45 g/10 min.;

4 Irganox® B 215 (made of about 34% by weight of Irganox® 1010 and 66% of Irgafos® 168);

The added amounts of components 1 to 4 were the following (percent by weight with respect to the total weight):

| Component | Amount |
|---|---|
| 1 | 51.5% |
| 2 | 12% |
| 3 | 1.3% |
| 4 | 0.2% |

Example 2

A polyethylene composition was prepared with the same catalyst and polymerization process as in Example 1, except that in the pre-contact step the TEAL/solid catalyst component weight ratio was equal to 4.6, and was then extruded with the same stabilizing additive composition and with the same extrusion conditions as in Example 1. The specific polymerization conditions and the resulting polymer properties are reported in Table I and Table II.

The stabilized composition was used in the preparation of a blend with the same added components in the same amounts as in Example 1.

The properties of the so obtained final composition are reported in Table III.

Comparative Example 1C

A comparative polyethylene composition was prepared with the same catalyst and polymerization process as in Example 1, except that in the pre-contact step the TEAL/solid catalyst component weight ratio is equal to 4, and was then extruded with the same stabilizing additive composition and with the same extrusion conditions as in Example 1. The specific polymerization conditions and the resulting polymer properties are reported in Table I and Table II.

As shown in said tables, component B) is an ethylene/propylene copolymer instead of the ethylene/butene-1 copolymer of Examples 1 and 2.

Thus, differently from the previous examples, the monomers fed to the second reactor are ethylene and propylene, instead of ethylene and butene-1.

The stabilized composition was used in the preparation of a blend with the same added components in the same amounts as in Example 1.

The properties of the so obtained final composition are reported in Table III.

TABLE I

| | | Example No. | | |
|---|---|---|---|---|
| | | 1 | 2 | 1C |
| 1st Reactor (component A)) | | | | |
| Temperature | °C. | 70 | 70 | 70 |
| Pressure | Barg | 20 | 20 | 20 |
| H2/C2– | mol. | 0.640 | 0.611 | 0.37 |
| C3–/(C3– + C2–) | mol. | 0.12 | 0.13 | 0.12 |
| Split | wt % | 51 | 37 | 40 |
| Xylene soluble (XS$_A$) | wt % | 3.2 | 4.5 | 4.3 |
| MFR of A) | g/10 min. | 7.8 | 10.7 | 14 |
| Density of A) | g/cm$^3$ | 0.94 | 0.94 | 0.94 |
| C3– content of A) | wt % | 2.7 | 2.9 | 2.8 |
| 2nd Reactor (component B)) | | | | |
| Temperature | °C. | 65 | 70 | 65 |
| Pressure | Barg | 20 | 20 | 20 |
| H2/C2– | mol. | 0.150 | 0.364 | 0.13 |
| C4–/(C4– + C2–) | mol. | 0.379 | 0.427 | — |
| C2–/(C2– + C3–) | mol. | — | — | 0.68 |
| Split | wt % | 49 | 63 | 60 |
| C2– content of B) | wt % | 84 | 80 | 80 |
| C4– content of B) | wt % | 16 | 20 | — |
| Xylene soluble of B) (XS$_B$) | wt % | 32 | 45 | 36 |
| Intrinsic Viscosity of XS$_B$ | dl/g | 2.7 | 1.3 | 2.3 |

Notes:
C2– = ethylene;
C3– = propylene;
C4– = butene-1;
split = amount of polymer produced in the concerned reactor.

TABLE II

| | | Example No. | | |
|---|---|---|---|---|
| | | 1 | 2 | 1C |
| Tm | °C. | 124.2 | 125.6 | 123.9 |
| MFR | g/10 min. | 0.73 | 6.5 | 0.56 |
| Xylene soluble (XS$_{TOT}$) | wt % | 14.6 | 26.9 | 23.1 |
| Intrinsic Viscosity of XS$_{TOT}$ | dl/g | 2.4 | 1.2 | 2.6 |
| Total C2– content | wt % | 91.0* | 86.3* | 84.9 |
| Total C4– content | wt % | 8.3 | 13.5 | — |
| Total C3– content | wt % | 0.7* | 0.2* | 15.1* |
| Tg of A) + B) | °C. | –52 | –57 | –46 |
| Flexural Modulus | MPa | — | 250 | 260 |

Notes:
C2– = ethylene;
C3– = propylene;
C4– = butene-1;
*Calculated values.

TABLE III

| | | Example No. | | |
|---|---|---|---|---|
| | | 1 | 2 | 1C |
| SEP of EXAMPLE | | 1 | 2 | 1C |
| SEP amount | wt % | 35 | 35 | 35 |
| MFR | g/10 min. | 4.7 | 11.2 | 4.2 |
| Flexural Modulus | MPa | 990 | 960 | 960 |
| Tensile Strength at Yield | MPa | 15.5 | 14.6 | 14.6 |
| Elongation at Yield | % | 11.8 | 12.6 | 12.8 |
| Tensile strength at break | MPa | 15.1 | 15.6 | 16.9 |
| Elongation at break | % | 550 | 600 | 460 |
| Gloss at 60° | ‰ | 46 | 62 | 29 |
| Longitudinal shrinkage | % | 0.47 | 0.26 | 0.4 |
| Transversal shrinkage | % | 0.63 | 0.51 | 0.63 |
| IZOD Impact Str. at 23° C. | KJ/m$^2$ | 59.2 | 56.9 | 64.7 |
| IZOD Impact Str. at –20° | KJ/m$^2$ | 51.0 | 42.2 | 58.6 |
| IZOD Impact Str. at –30° | KJ/m$^2$ | 26.9 | 11.9 | 35.7 |

What is claimed is:

1. An ethylene polymer composition comprising:
    A) 30-60% by weight of an ethylene polymer containing 10% or less relative to the weight of A), of a fraction XS$_A$ soluble in xylene at 25° C.; and
    B) 40-70% by weight of a copolymer of ethylene with at least one olefin of formula HC$_2$=CHR, wherein R is an alkyl radical, linear or branched, having from 1 to 8 carbon atoms, containing 65-90% by weight of ethylene and 55-15% by weight of a fraction XS$_B$ soluble in xylene at 25° C., wherein both the ethylene of the copolymer and XS$_B$ amounts refer to the weight of B), wherein the intrinsic viscosity [η] of the XS$_B$ fraction is 0.8-3.2 dl/g;
    wherein the amounts of A) and B) refer to the total weight of A)+B).

2. The ethylene polymer composition of claim 1, wherein the ethylene polymer A) is an ethylene homopolymer (i) or a copolymer (ii) of ethylene with one or more comonomers selected from olefins having the formula CH$_2$=CHR$^1$, wherein R$^1$ is a linear or branched alkyl radical having 1-10 carbon atoms, or a mixture of (i) and (ii).

3. The ethylene polymer composition of claim 1, wherein the ethylene polymer A) has a density of 0.930-0.960 g/cm$^3$ as determined according to ISO 1183 at 23° C.

4. The ethylene polymer composition of claim 1, wherein the composition comprises a melting peak at a temperature T$_m$ of 120° C. or higher as measured by differential scanning calorimetry (DSC) with a heating rate of 20° C. per minute.

5. The ethylene polymer composition of claim 1, wherein the composition comprises a melt flow rate (MFR) value of 0.3 to 15 g/10 min as determined according to ISO 1133 at 230° C. with a load of 2.16 kg.

6. The ethylene polymer composition of claim 1, having at least one of the following additional features:
    a melt flow rate (MFR) value of the ethylene polymer A), as determined according to ISO 1133 at 230° C. with a load of 2.16 kg, of 1-20 g/10 min;
    a glass transition temperature (Tg), as measured using a blend of A)+B), of –45 to –60° C.;
    a T$_g$ of component B) of equal to or higher than –50° C.;
    an ethylene content, as determined based on the total amount of A)+B), of 75-93% by weight;
    an amount of total fraction soluble in xylene (XS$_{TOT}$) at 25° C., as determined by extraction carried out on the total amount of A)+B), of 10-35% by weight;
    an intrinsic viscosity [η] of the XS$_{TOT}$ fraction of 0.8 dl/g or more; and
    a flexural modulus value from 150 to 350 MPa.

7. A polymerization process for preparing the ethylene polymer composition of claim 1, comprising at least two sequential stages, wherein components A) and B) are prepared in separate subsequent stages, operating in each stage, except the first stage, in the presence of the polymer formed and the catalyst used in the preceding stage.

8. A polyolefin composition comprising the ethylene polymer composition of claim 1 and at least 50% by weight based on the total weight of the polyolefin composition, of one or more additional polyolefins.

9. The polyolefin composition of claim 8, wherein the additional polyolefin or polyolefins are selected from propylene homopolymers and copolymers.

10. A formed article comprising the polyolefin composition of claim 8.

11. The formed article of claim 10, comprising an injection molded article.

12. A formed article comprising the polyolefin composition of claim 9.

13. The formed articles of claim 12, comprising an injection molded article.

* * * * *

UNITED STATES PATENT AND TRADEMARK OFFICE
CERTIFICATE OF CORRECTION

PATENT NO. : 10,087,318 B2  
APPLICATION NO. : 15/313503  
DATED : October 2, 2018  
INVENTOR(S) : Cavalieri et al.

Page 1 of 1

It is certified that error appears in the above-identified patent and that said Letters Patent is hereby corrected as shown below:

On the Title Page

Item (56), under 'Other Publications', Line 1, delete "Opinon" and insert -- Opinion --

In the Specification

In Column 3, Line 28, after "of" before "reaction" insert -- the --  
In Column 5, Line 43, delete "diatomaceaous" and insert -- diatomaceous --  
In Column 6, Line 51, after "with" before "maximum" insert -- the --

In the Claims

In Column 12, Claim 2, Line 22, after "redical" before "having" insert -- , --  
In Column 12, Claim 5, Line 33, delete "0.3 to 15 g/10" and insert -- 0.3-g/10 --  
In Column 12, Claim 8, Line 58, after "1" before "and" insert -- , --  
In Column 13, Claim 13, Line 3, delete "articles" and insert -- article --

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*